(12) United States Patent
Krause

(10) Patent No.: US 11,524,631 B2
(45) Date of Patent: Dec. 13, 2022

(54) SENSING BED STEP FOR VEHICLE

(71) Applicants: Hyundai Motor Company, Seoul (KR); Kia Motors Corporation, Seoul (KR)

(72) Inventor: Margaux Krause, Pinckney, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 288 days.

(21) Appl. No.: 15/931,259

(22) Filed: May 13, 2020

(65) Prior Publication Data

US 2021/0354629 A1  Nov. 18, 2021

(51) Int. Cl.
| | |
|---|---|
| *B60R 3/00* | (2006.01) |
| *G01L 1/04* | (2006.01) |
| *G07C 9/00* | (2020.01) |
| *H05B 47/105* | (2020.01) |
| *B60R 16/03* | (2006.01) |

(52) U.S. Cl.
CPC ............... *B60R 3/00* (2013.01); *G01L 1/042* (2013.01); *G07C 9/00309* (2013.01); *H05B 47/105* (2020.01); *B60R 16/03* (2013.01); *G07C 2009/00507* (2013.01)

(58) Field of Classification Search
None
See application file for complete search history.

(56) References Cited

U.S. PATENT DOCUMENTS

| | | | |
|---|---|---|---|
| 7,367,574 B2 | 5/2008 | Leitner | |
| 7,688,179 B2 * | 3/2010 | Kurpinski | G07C 9/00309 340/4.1 |
| 8,896,417 B2 | 11/2014 | Song et al. | |
| 9,830,754 B2 | 11/2017 | Kim | |
| 11,098,520 B2 * | 8/2021 | Tamura | E05F 15/73 |
| 2014/0330486 A1 | 11/2014 | Gehin et al. | |

FOREIGN PATENT DOCUMENTS

| | | |
|---|---|---|
| KR | 10-2014-0058970 A | 5/2014 |
| KR | 101588782 B1 | 1/2016 |

* cited by examiner

*Primary Examiner* — K. Wong
(74) *Attorney, Agent, or Firm* — Fox Rothschild LLP

(57) ABSTRACT

A method of activating a vehicle function is provided. The method includes detecting a force exerted onto a bed step of a vehicle using a pressure sensor. A controller detects whether the amount of force exerted onto the bed step is greater than a force threshold. When the force exertion force exceeds the force threshold, one of a plurality of pressure patterns is detected. One of a plurality of vehicle functions is then activated based on the detected pressure pattern.

19 Claims, 6 Drawing Sheets

Button Mode:
Foot or hand presses step button.

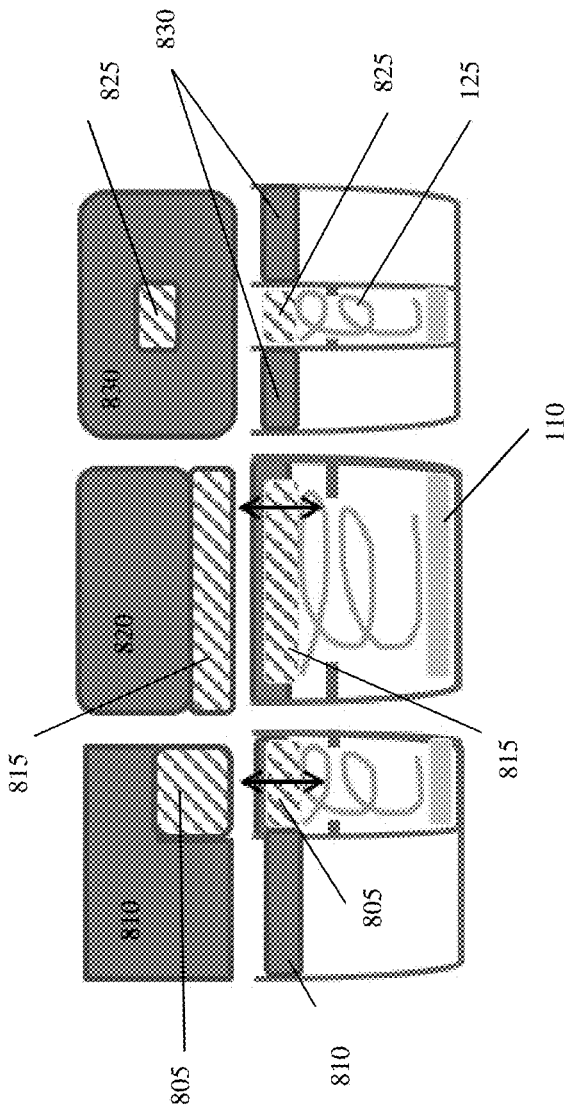

SENSING BED STEP FOR VEHICLE

TECHNICAL FIELD

The present disclosure relates to a method and system for activating a vehicle function, and more particular, to a technology for activating a vehicle function using a sensing bed step of the vehicle.

BACKGROUND

With the advancement of vehicle technology, user convenience is also being continuously developed. One such advancement is particularly applied to a truck vehicle having a bed at a rear thereof. These types of vehicles are often used to carry heavy loads. Thus, when approaching the rear of the vehicle, it is often desirable to rapidly activate bed features such as opening the tailgate and operating lights mounted within the bed of the vehicle. Conventionally, such feature activation is located within the vehicle cabin. For example, buttons near the driver's seat of the vehicle provide activation of a tailgate and bed lights. Alternately, the buttons are provided on a key fob which requires the user to have access to the key fob while potentially carrying a heavy load towards the vehicle. As another example, tailgate activation may be based on a motion sensor. However, such a motion sensor often erroneously detects an activation of the tailgate thus decreasing user convenience.

SUMMARY

The present disclosure provides a method for activating a vehicle function. According to an exemplary embodiment of the present disclosure the activation method may include detecting a force that is exerted onto a bed step of a vehicle and then measuring an amount of force exerted onto the bed step. In response to determining that the amount of force exerted onto the bed step is greater than a force threshold, one of a plurality of pressure patterns may be detected. One of a plurality of vehicle functions may be activated based on the detected pressure pattern.

According to an exemplary embodiment, the pressure sensor may be activated in response to the controller detecting a key fob within a predetermined distance from the vehicle. The detection of the key fob may provide authentication to activate the pressure sensor. Once a vehicle function is activated, a further detection of a force exerted onto the bed step initiates a deactivation of the vehicle function activated based on the detected pressure pattern.

The plurality of vehicle functions may include operating a tailgate and operating a plurality of lights within a bed at a rear of the vehicle. Additionally, the vehicle functions may include operating a bed cover, operating an audio system within the bed of the vehicle, and activating power outlets within the bed of the vehicle.

Furthermore, in response to detecting a pressure pattern of force exertion for less than a predetermined amount of time, a first vehicle function may be activated. The first vehicle function may include opening the tailgate of the vehicle. In response to detecting a repetition of the pressure pattern of force exertion for less than the predetermined amount of time, the tailgate may be closed and the first vehicle function may be deactivated.

In response to detecting a pressure pattern of force exertion for greater than a predetermined amount of time, a second vehicle function may be activated. The second vehicle function may include activating a timer and turning on a plurality of lights within the bed of the vehicle. Additionally, in response to determining that a preset time of the timer has elapsed, the lights within the bed of the vehicle are turned off. Alternately, in response to detecting a repetition of the pressure pattern of force exertion for greater than a predetermined amount of time after operating the lights, the lights within the bed of the vehicle may be turned off.

Additionally, in response to force being exerted onto the bed step, a first portion of the bed step may be lowered and locked and a second portion of the bed step may remain fixed. The first portion of the bed step may be spring-loaded. In response to determining that the preset time has elapsed, the bed step locked down by force exertion may be released to thus turn off the lights within the bed of the vehicle.

According to another aspect of the present disclosure, a vehicle step control system may include a bed step mounted at a rear side of a vehicle onto which user force may be exerted. Additionally, a spring coil may be configured to control the vertical movement of the bed step and a pressure sensor may be configured to measure the amount of force exerted onto the bed step. A controller may be mounted within the vehicle and configured to operate the pressure sensor and activate a vehicle function in response to detecting one of a plurality of pressure patterns corresponding to the measured amount of force exerted onto the bed step.

In particular, the controller may be configured to detect the plurality of pressure patterns in response to determining that the amount of force exerted onto the bed step is greater than a force threshold. A first pressure pattern including an exertion of force on the bed step for less than a predetermined amount of time may be detected and in response, a tailgate of the vehicle may be operated to open. Additionally, a second pressure pattern including an exertion of force on the bed step for greater than the predetermined amount of time may be detected during which the bed step may be held in a lowered position due to the force exertion.

In response to detecting the second pressure pattern, a timer may be activated and a plurality of lights within a bed of the vehicle may be turned on. When a preset time of the time has elapsed, the controller may be configured to release the bed step to return the bed step to an original position and turn off the lights. Additionally, in response to force being exerted onto the bed step, a first portion of the bed step may be lowered and locked and a second portion of the bed step may remain fixed.

BRIEF DESCRIPTION OF THE DRAWINGS

Exemplary embodiments of the present disclosure will become more apparent by describing in detail forms of the present disclosure with reference to the accompanying drawings, in which:

FIGS. 8A-8C illustrate alternate configurations of the bed step according to an exemplary embodiment of the present disclosure.

Figure 1A:
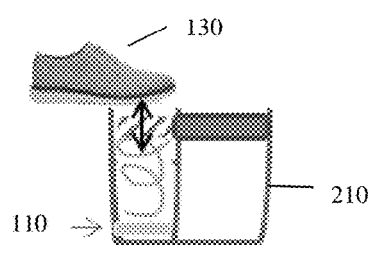
FIGS. 1A-1B illustrate an exemplary bed step of a vehicle according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, exemplary embodiments of the present disclosure will be described in detail with reference to the accompanying drawings. As those skilled in the art would realize, the described exemplary embodiments may be modified in various different manners, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion powered vehicles, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/controller unit/control unit may perform one or more of the processes described further below, and the term controller/controller unit/control unit refers to a hardware device that includes a memory and a processor. The memory is configured to store the modules, and the processor is specifically configured to execute said modules to perform one or more processes. The one or more processes are described further below. Moreover, it is understood that the units or modules described herein may embody a controller/controller unit/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed there between. In contrast, when it is mentioned that a certain component is "directly coupled with" or "directly connected with" another component, it will be understood that a further component is not disposed there between.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure provides a vehicle bed step that is capable of being at least partially depressed to activate a vehicle tailgate, vehicle bed lights, or similar features thus improving user convenience. In particular, based on detected pressure patterns of force exerted onto the bed step, different vehicle functions are capable of being activated as further described herein below.

Figure 1B:
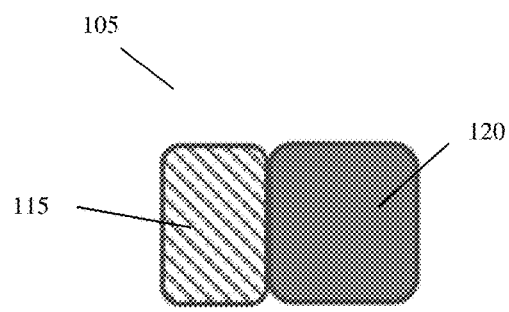
Figure 2A:
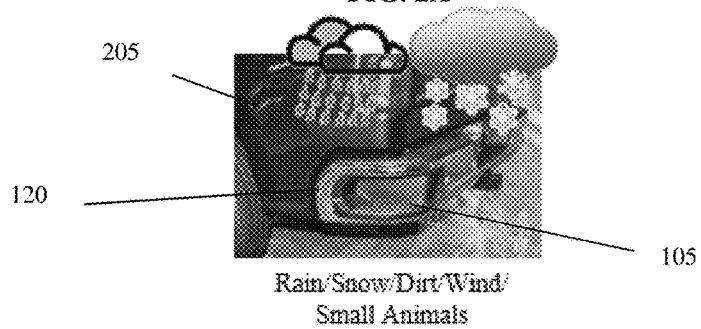
FIGS. 2A-2B illustrate a threshold force required to trigger a vehicle function activation according to an exemplary embodiment of the present disclosure.
Figure 2A:
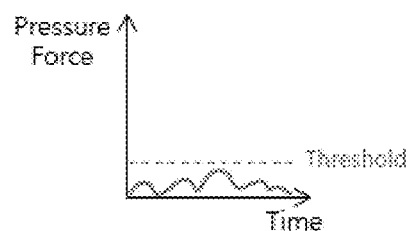

Referring to FIGS. 1A-1B, the present disclosure provides a vehicle step control system. In particular, the system includes a bed step 105 that may be mounted at the rear of a vehicle 205 (see FIG. 2A) and a pressure sensor 110 configured to detect force exerted onto the step. As shown in FIG. 2A, the bed step may be mounted into a housing 210 at the rear of the vehicle 205. A spring coil 125 may be attached between a bottom surface of the bed step and the housing to control a vertical movement of the bed step when force is exerted there onto. A plurality of lock pins may also be provided within the housing to hold the bed step in a lowered position (e.g., lock the bed step down). A controller within the vehicle may be configured to communicate with the pressure sensor to transmit information regarding the pressure exerted onto the bed step. A further description of such communication will be described herein below.

According to an exemplary embodiment of the present disclosure, the bed step 105 may be divided into two portions. For example, a first portion 115 may be a movable in a vertical direction and a second portion 120 may be fixed. As shown in FIG. 1A, a user may exert force onto the first portion 115 of the bed step 105 by stepping onto the first portion 115 with a foot 130. Based on the exerted pressure when the user steps onto the bed step 105, the first portion 115 may be lowered into the housing 210 while the second portion 120 remains fixed. By maintaining one portion fixed, the user is capable of still standing on the fixed portion of the step to, for example, reach into the bed of the vehicle. Notably, the present disclosure is not limited to a foot activating the bed step and, a foot, hand, elbow, or other components may be used to exert pressure onto the bed step.

Figure 2B:
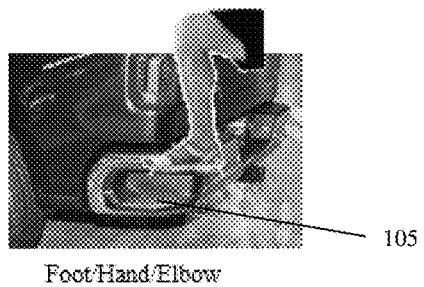
Figure 2B:
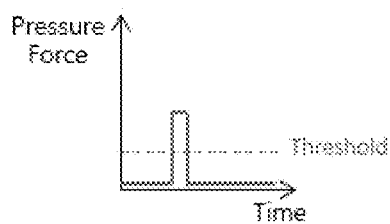
Figure 2C:
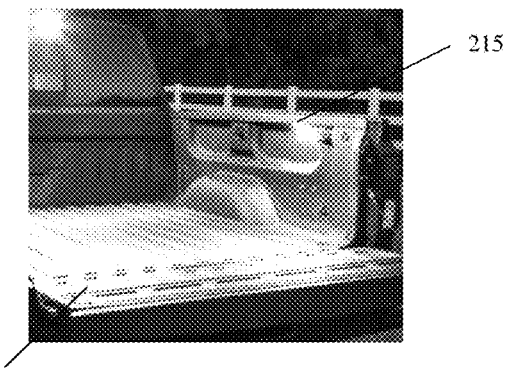
FIG. 2C illustrates vehicle functions to be activated according to an exemplary embodiment of the present disclosure.

Herein below, a process of detecting pressure patterns to determine vehicle function activation will be described. First, as shown in FIG. 2A, to prevent false detection of force exertion on the bed step thus falsely activating a vehicle feature, a force threshold must be detected to activate the pressure pattern detection. This threshold limitation prevents false activation of a vehicle feature based on for example, an animal or weather conditions. For example, the force threshold may be about 10 lbs./4.5 kg to trigger the detection of pressure patterns, however, the present disclosure is not limited thereto. Once a force greater than the force threshold is detected by the pressure sensor as shown in FIG. 2B, the controller may be configured to detect a plurality of pressure patterns to determine a corresponding vehicle function to be activated. The vehicle functions, as shown in FIG. 2C, may include opening a vehicle tailgate 220 and/or turning on lights 215 mounted within the bed at the rear of the vehicle. However, the present disclosure is not limited thereto and the vehicle functions may further include turning on a radio within the bed, turning power outlets mounted within the bed on or off, opening or closing a cover (e.g., tonneau cover) of the bed, and the like.

Additionally, according to one exemplary embodiment, the pressure sensor may remain in an inactive state until a key fob is detected. In particular, the controller may be configured to detect when a key fob is within a predetermined distance from the vehicle using a proximity sensor mounted within the vehicle. This further prevents false pressure detection and activation of a vehicle function as well as provides authentication for activating the pressure sensor. Therefore, two conditions are required to be satisfied to initiate the pressure pattern detection. That is, the first condition may be that the key fob is within a predetermined distance (e.g., about 3-5 meters from the vehicle) from the vehicle and the second condition may be that the force exerted onto the bed step is greater than a force threshold. When both conditions are satisfied and confirmed by the controller, the controller may be configured initiate pressure pattern detection to be described in detail herein below.

Figure 3A:
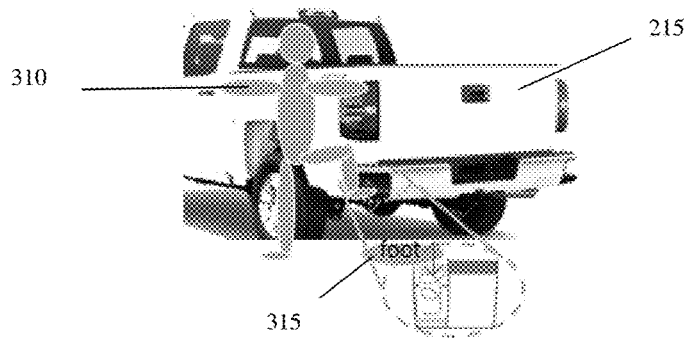
FIGS. 3A-3B illustrate a button mode of a bed step according to an exemplary embodiment of the present disclosure.

FIGS. 3A-4B illustrate two pressure patterns, including a button mode and a step mode, that activate different vehicle functions. FIG. 3A-3B illustrates the first pressure pattern, the button mode, in which force is exerted by a user 310 onto the bed step by a foot 315 or other means. In particular, once the controller determines that the pressure exerted onto the bed step is greater than the force threshold, the controller may be configured to detect that amount of time for which the force is exerted onto the bed step.

In response to detecting that the force exertion on the bed step is less than a predetermined time (e.g., less than about 3 seconds), the controller may be configured to determine the pressure pattern to be a first pressure pattern. This pressure pattern may be described as a mere click of a button or step on, step off of the bed step. Accordingly, in response to detecting the first pressure pattern, the controller may be configured to activate a first vehicle function. The first vehicle function may include opening a tailgate at the rear of the vehicle (e.g., at the truck bed).

Figure 3B:
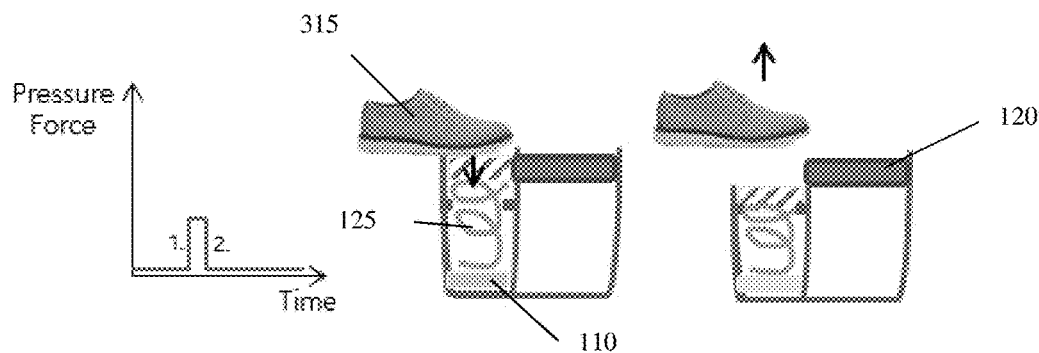

FIG. 3B illustrates a graph corresponding to the time that the force is exerted onto the step and the corresponding action by the foot 315 of the vehicle. That is, FIG. 3B shows that the foot 315 is rapidly stepped onto the bed step (e.g., a single press) which compresses the spring coil 125 and allows the first portion of the bed step to be lowered while the second portion remains fixed. The arrows in FIG. 3B indicate the vertical movement of the foot onto and off of the bed step. The position of the bed step at the bottom of the housing may be locked into place by lock pins. For example, lock pins may be mounted and coupled to a bottom surface of the first portion of the bed step and may engage with corresponding lock pins at the bottom of the housing. The lock pins may be released when the step is pressed again to thus release the bed step.

Once the first vehicle function (e.g., the tailgate) has been activated, an additional force exertion may be used to then deactivate the first vehicle function. For example, the controller may be configured to detect a repetition of the first pressure pattern in which the force is exerted for less than the predetermined amount of time. In response to detecting the first pressure pattern again, the controller may be configured to close the tailgate and then deactivate the first vehicle function.

Figure 4A:
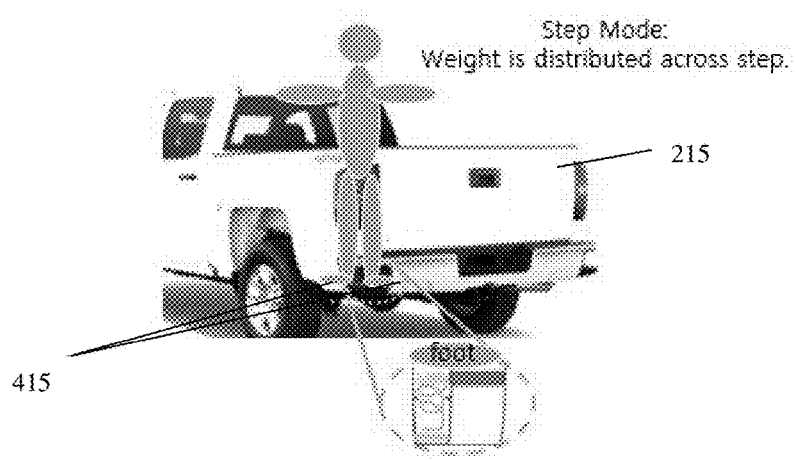
FIGS. 4A-4B illustrate a step mode of a bed step according to an exemplary embodiment of the present disclosure.
Figure 4B:
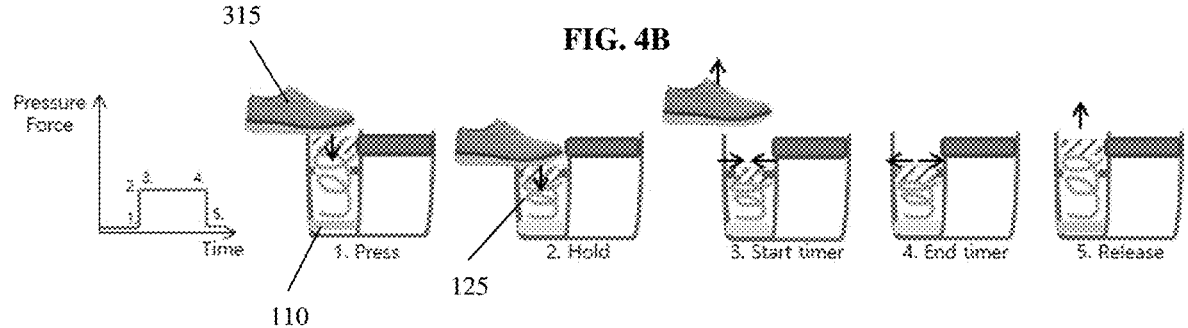

FIGS. 4A-4B illustrate the detection of a second pressure pattern in the step mode. For example, as shown in FIG. 4A, in the step mode, a user may step onto the bed step with weight distributed across the step (as shown by reference numeral 415). That is, the user may step onto the bed step with both feet as opposed to just one foot shown in FIG. 3A. Once the controller determines that the pressure exerted onto the bed step is greater than the force threshold, the controller may be configured to first detect that the foot 315 is exerting force onto the first portion of the step.

Then, the controller may be configured to determine that the force exertion is being held for greater than a predetermined amount of time (e.g., equal to or greater than about 3 seconds). In response to determining that the force exertion is for greater than the predetermined period of time, the controller may be configured to activate a second vehicle function. In particular, the second vehicle function may include initiating or activating a timer and turning on a plurality of light within the bed of the vehicle. Once the lights are on, the user may release the force exertion as shown by the upward arrow in FIG. 4B. That is, once the timer is activated, the first portion of the bed step is held in a locked down or lowered state.

After the lights in the bed of the vehicle have been turned on, this second vehicle function may be deactivated in different manners. First, once a preset time of the timer has elapsed, the lock pins may release the first portion of the bed step and in response, the lights may be turned off. That is, once the timer ends, the lights may be turned off. The bed step (e.g., first portion thereof) may thus be returned to an original position and the second vehicle function may be deactivated.

Alternately, the controller may be configured to detect a repetition of the second pressure pattern. That is, the controller may be configured to detect another force exertion for greater than the predetermined amount of time. This, for example, may indicate that the user steps back onto the bed step after the lights have been turned on with the intention of turning the lights off. Thus, in response to detecting the repetition of the second pressure pattern after the lights have been turned on, the controller may be configured to turn off the lights.

Figure 5:
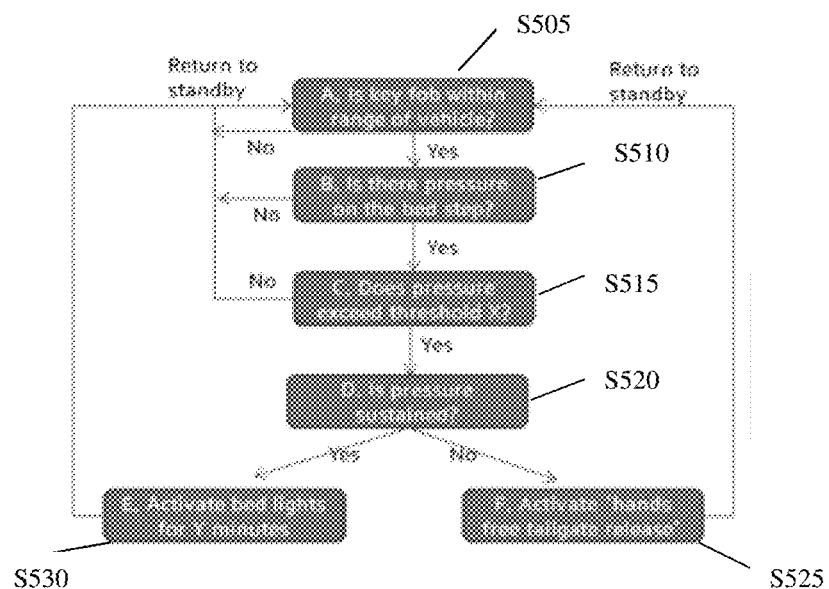
FIG. 5 illustrates a method of activating a vehicle function using a bed step according to an exemplary embodiment of the present disclosure.

Furthermore, FIG. 5 illustrates a flowchart of the method of operating the bed step for vehicle function activation according to an exemplary embodiment of the present disclosure. The method described herein below may be executed by a controller. In particular, the method may begin with determining whether a key fob (or other similar device) is within a predetermined range of the vehicle (S505). In response to determining that the key fob is beyond the predetermined range of the vehicle, the controller returns to a standby mode. The controller may be configured to continuously sense the distance to a key fob. In response to determining that the key fob is within the predetermined range, the method includes determining whether force is exerted onto the bed step (S510). When no pressure is detected, the controller enters the standby mode again. However, in response to detecting the force exertion on the step, the method may include determining whether the force exertion exceeds a force threshold (S520). When the detected force exertion is less than the force threshold, the controller enters the standby mode again.

Figure 6A:
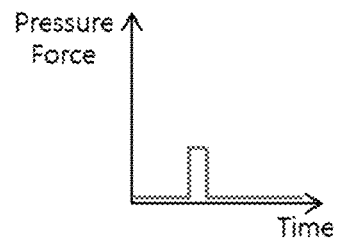
FIG. 6A illustrates a pressure over time graph based on a first pressure pattern according to an exemplary embodiment of the present disclosure.
Figure 6B:
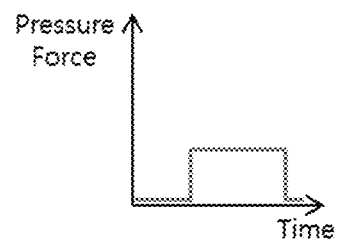
FIG. 6B illustrates a pressure over time graph based on a second pressure pattern according to an exemplary embodiment of the present disclosure.

In response to detecting that the force exertion is greater than the force threshold, the method may include determining whether the force is sustained (S520). In other words, the controller may be configured to detect the length of time for which the force is exerted onto the bed step. In response to determining that the length of time is less than a predetermined threshold (as shown in FIG. 6A), the method may include activating a hands-free tailgate release (S525) in which the tailgate at the rear of the vehicle is opened. Additionally, in response to determining that the length of time is greater than the predetermined threshold (as shown in FIG. 6B), the method may include activating bed lights for a predetermined period of time (S530). After each vehicle function activation, the controller may be configured to return to the standby mode. Once activated, a repetition of the force exertion may deactivate the vehicle functions.

Figure 7A:
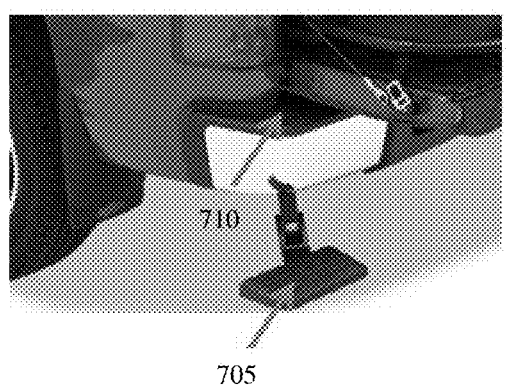
FIGS. 7A-7B illustrate alternate locations of the bed step on the vehicle according to an exemplary embodiment of the present disclosure.

Moreover, according to another aspect of the present disclosure, the bed step is not limited to being mounted at the side-rear of the vehicle near the bed of the vehicle. For example, as shown in FIG. 7A, the bed step 710 may be integrated with the vehicle at the rear of the vehicle or alternately, the bed step 705 may be provided as an additional or removable attachment to the vehicle body. In both configurations, the bed step may be in communication with the vehicle controller (e.g., ECU) by either wired or wireless communication.

Figure 7B:
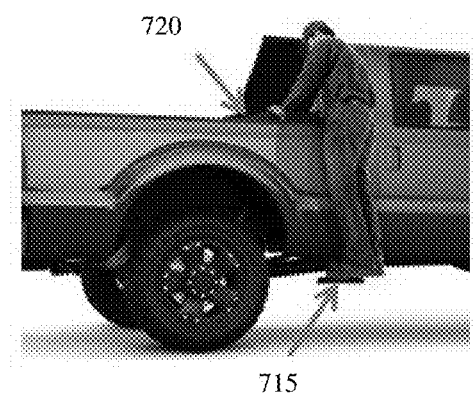

Additionally, as shown in FIG. 7B, the bed step 720 may be mounted at the top of the vehicle where it may be operated more as a hand device. Alternately, the bed step 715 may be mounted at the side of the vehicle bed, near the passenger or driver door of the vehicle. These different configurations provide different user conveniences based on use. Additionally, when provided as a separate attachment, the bed step may be installed at the varied locations by user preference. The bed step may be formed in various sizes and multiple bed steps may also be provided. For example, if multiple bed steps are provided, each bed step may be capable of activating all the vehicle functions or alternately, each may be configured to activate a different vehicle function. As an example, a rear bed step may be used to activate the tailgate and a side bed step also mounted on the vehicle may be used to activate power outlets within the bed of the vehicle.

Furthermore, FIGS. 8A-8C illustrate alternate configurations for the bed step formed in a first portion and a second portion. For example, in the figures, elements 805, 815, and 825 illustrate the first portion of the bed step that is moveable in a vertical direction. Elements 810, 820, and 830 illustrate the second portion of the bed step that is fixed. FIGS. 8A and 8B illustrate configurations that may be activated by a hand or a foot whereas FIG. 8C illustrates a configuration that may be mainly activated by a hand due to the positioning of the moveable first portion of the bed step. These figures provide a showing of various contemplated configuration options of the bed step but the present disclosure is not limited thereto.

According to another exemplary embodiment of the present disclosure, the controller may be configured to detect surrounding conditions to determine which vehicle function to activate in response to detect the force exertion on the bed step. For example, in response to detecting low light conditions using a light sensor, detecting the time of day, or the like, the controller may be configured to automatically also turn on the lights within the vehicle bed in response to detecting the pressure pattern for operating the tailgate. The low light conditions may also be detected, for example, when the vehicle is parked in a garage, the bed cover is closed, or it is dark outside. This feature would further improve user convenience during low light conditions.

Notably, the present disclosure is not limited to the pressure sensor as described herein. In particular, instead of a pressure sensor, a variety of other devices and techniques may be used to detect the force exerted onto the pressure step. For example, sensor detent positions, accelerometer, solenoid, capacitance, and the like may be used to detect the force exertion.

Additionally, according to yet another exemplary embodiment, other types of pressure patterns may be detected other than in relation to time. For example, a soft press and a hard press may be distinguishable. This feature may also be used when a hand or finger is used instead of a foot to activate the bed step. In particular, the pressure sensor may be configured to detect a pressure pattern based on how hard the bed step is pressed. Alternately, taps may be used to detect a pressure pattern. For example, a different number of taps may correspond to a different vehicle function. That is, a single tap may correspond to activating the tailgate whereas multiple taps (e.g., 3 taps) may correspond to turning on the lights within the bed of the vehicle.

Advantageously, the present disclosure provides a user convenient method of operating vehicle truck bed features such as a vehicle tailgate, truck bed lights, and other features thus eliminating the need for operating a key fob or buttons disposed within the vehicle cabin. The bed step activation also prevents false positive activation of truck bed features and provides safe activation of the features. For example, the location of the bed step does not provide potential interference between a user's knee or foot and the tailgate as the tailgate is lowered in an opening activation. The location of the step also omits the need for a user to locate a particular button on a key fob to activate vehicle features. Additionally, a user is capable of, for example, turning on truck bed lights upon reaching the vehicle while carrying a heavy load without having to enter the vehicle again to manipulate light buttons mounted therein.

According to the above described technical features, the present disclosure is capable of activating a plurality of different vehicle functions by going beyond merely detecting a single pressure and instead detecting different pressure patterns that correspond to a different vehicle function. Therefore, the present disclosure further increases user convenience using merely a pressure sensor and does not require expensive equipment such as lasers for motion detection.

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A method of activating a vehicle function, comprising:
   detecting, by a controller, a force exerted onto a bed step of a vehicle, using a pressure sensor;
   detecting, by the controller, an amount of force exerted onto the bed step;
   in response to detecting that the amount of force exerted onto the bed step is greater than a force threshold, detecting, by the controller, one of a plurality of pressure patterns;
   activating, by the controller, one of a plurality of vehicle functions based on the detected pressure pattern,
   wherein once a vehicle function is activated, a further detection of a force exerted onto the bed step initiates a deactivation of the vehicle function activated based on the detected pressure pattern.

2. The method of claim 1, wherein the pressure sensor is activated in response to the controller detecting a key fob within a predetermined distance from the vehicle.

3. The method of claim 1, wherein the plurality of vehicle functions include at least one of operating a tailgate and operating a plurality of lights within a bed at a rear of the vehicle.

4. The method of claim 3, wherein the plurality of vehicle functions further include operating a bed cover, operating an audio system within the bed of the vehicle, and activating power outlets within the bed of the vehicle.

5. The method of claim 3, further comprising:
   in response to detecting a pressure pattern of a force exertion for less than a predetermined amount of time, activating a first vehicle function,
   wherein the first vehicle function is opening the tailgate of the vehicle.

6. The method of claim 5, further comprising:
   in response to detecting a repetition of the pressure pattern of force exertion for less than the predetermined amount of time, closing the tailgate and deactivating the first vehicle function.

7. The method of claim 3, further comprising:
   in response to detecting a pressure pattern of force exertion for greater than a predetermined amount of time, activating a second vehicle function,
   wherein the second vehicle function includes activating a timer and turning on the plurality of lights within the bed of the vehicle.

8. The method of claim 7, further comprising:
   determining, by the controller, that a preset time of the timer has elapsed and in response, turning off the lights within the bed of the vehicle.

9. The method of claim 7, further comprising:
   in response to detecting a repetition of the pressure pattern of force exertion for greater than the predetermined amount of time after operating the lights, turning off the lights within the bed of the vehicle.

10. The method of claim 9 wherein in response to force being exerted onto the bed step, a first portion of the bed step is lowered and locked and a second portion of the bed step remains fixed.

11. The method of claim 10, wherein the first portion of the bed step is spring-loaded.

12. The method of claim 10, wherein in response to determining that the preset time has elapsed, releasing the bed step locked down by force exertion to turn off the plurality of lights within the bed of the vehicle.

13. The method of claim 2, wherein the detection of the key fob within the predetermined distance from the vehicle provides authentication to activate the pressure sensor.

14. A vehicle step control system, comprising:
   a bed step mounted at a rear side of a vehicle, onto which user force is exerted;
   a spring coil configured to control vertical movement of the bed step;
   a pressure sensor configured to detect the amount of force exerted onto the bed step; and
   a controller mounted within the vehicle and configured to operate the pressure sensor and activate a vehicle function in response to detecting one of a plurality of pressure patterns corresponding to the detected amount of force exerted onto the bed step,
   wherein once a vehicle function is activated, the controller is further configured to deactivate the vehicle function activated based on the detected pressure pattern in response to a further detection of a force exerted onto the bed step.

15. The system of claim 14, wherein the controller is configured to detect the plurality of pressure patterns in response to determining that the amount of force exerted onto the bed step is greater than a force threshold.

16. The system of claim 15, wherein the controller is configured to:
   detect a first pressure pattern including an exertion of force on the bed step for less than a predetermined amount of time; and
   in response to detecting the first pressure pattern, operate a tailgate of the vehicle to open.

17. The system of claim 16, wherein the controller is configured to:
   detect a second pressure pattern including an exertion of force on the bed step for greater than the predetermined amount of time, wherein the bed step is held in a lowered position due to the force exertion; and
   in response to detecting the second pressure pattern, activate a timer and turn on a plurality of lights within a bed of the vehicle.

18. The system of claim 17, wherein in response to a preset time of the timer elapsing, the controller is configured to release the bed step to return the bed step to an original position and turn off the plurality of lights within the bed of the vehicle.

19. The system of claim, 14, wherein in response to force being exerted onto the bed step, a first portion of the bed step is lowered and locked and a second portion of the bed step remains fixed.

\* \* \* \* \*